US012479081B2

(12) United States Patent
Kuter-Arnebeck et al.

(10) Patent No.: US 12,479,081 B2
(45) Date of Patent: Nov. 25, 2025

(54) STORAGE BIN WITH RETAINING FEATURE

(71) Applicant: Snap-on Incorporated, Kenosha, WI (US)

(72) Inventors: Ottoleo Kuter-Arnebeck, Kenosha, WI (US); Nicholas H. Weir, Silver Lake, WI (US)

(73) Assignee: Snap-on Incorporated, Kenosha, WI (US)

( * ) Notice: Subject to any disclaimer, the term of this patent is extended or adjusted under 35 U.S.C. 154(b) by 218 days.

(21) Appl. No.: 17/211,051

(22) Filed: Mar. 24, 2021

(65) Prior Publication Data
US 2021/0323139 A1    Oct. 21, 2021

Related U.S. Application Data

(60) Provisional application No. 63/010,753, filed on Apr. 16, 2020.

(51) Int. Cl.
| | |
|---|---|
| *B25H 3/06* | (2006.01) |
| *B62B 5/00* | (2006.01) |
| *B62B 5/06* | (2006.01) |

(52) U.S. Cl.
CPC ............ *B25H 3/06* (2013.01); *B62B 5/0083* (2013.01); *B62B 5/063* (2013.01)

(58) Field of Classification Search
CPC ... B25H 3/06; B25H 3/00; B25H 3/04; B25H 5/00; B25H 1/04

(Continued)

(56) References Cited

U.S. PATENT DOCUMENTS

| 542,341 A | 7/1895 | Little |
| 936,969 A | 10/1909 | Williams |

(Continued)

FOREIGN PATENT DOCUMENTS

| CN | 2597354 Y | 1/2004 |
| CN | 105124930 A | 12/2015 |

(Continued)

OTHER PUBLICATIONS

Taiwan Office Action for corresponding TW Application No. 110113546, dated Sep. 29, 2021, 10 pages.

(Continued)

*Primary Examiner* — Anthony D Stashick
*Assistant Examiner* — Prince Pal
(74) *Attorney, Agent, or Firm* — Taft Stettinius & Hollister LLP

(57) ABSTRACT

A storage container, basin, bin, or basket (referred to herein as a storage bin) with wheels. The storage bin includes retaining features or tabs that protrude on one side higher than a plane formed by an upper edge of the storage bin to keep the storage bin located under a tool storage cabinet or toolbox. The retaining features allow the storage bin to be slid under the tool storage cabinet or toolbox with the retaining features disposed between opposing front and back flanges on the bottom of the tool storage cabinet or toolbox. This allows the storage bin to be slid out and back under the tool storage cabinet or toolbox, while the retaining feature restricts the storage bin from being slid completely out from under tool storage cabinet or toolbox.

9 Claims, 10 Drawing Sheets

(58) Field of Classification Search
USPC .................................. 248/47.34; 206/349
See application file for complete search history.

(56) References Cited

U.S. PATENT DOCUMENTS

| | | | | |
|---|---|---|---|---|
| 2,981,549 | A * | 4/1961 | Hotton | A47B 31/00 280/47.35 |
| 3,656,587 | A | 4/1972 | Siegel | |
| 4,026,616 | A | 5/1977 | Kuehl | |
| 4,109,926 | A * | 8/1978 | Lane | B62B 3/002 280/43.24 |
| 4,203,609 | A * | 5/1980 | Mitchell | B62D 63/08 108/55.3 |
| 4,337,988 | A | 7/1982 | Schenck | |
| 4,373,761 | A * | 2/1983 | Hansberry, Jr. | B25H 5/00 182/132 |
| 4,418,969 | A | 12/1983 | Hettman | |
| 4,458,906 | A * | 7/1984 | Lamson | B62B 3/00 280/47.36 |
| 4,491,375 | A | 1/1985 | Ugalde | |
| 4,637,413 | A * | 1/1987 | Llewellyn | B08B 17/00 134/172 |
| 4,669,790 | A | 6/1987 | Briggs | |
| D292,937 | S * | 11/1987 | Richey | D34/19 |
| 4,796,909 | A * | 1/1989 | Kirkendall | B62B 3/02 180/906 |
| 4,893,885 | A | 1/1990 | Borello | |
| 5,070,556 | A * | 12/1991 | Gloger | A47C 19/005 312/334.25 |
| 5,205,629 | A | 4/1993 | Simons | |
| 5,228,761 | A * | 7/1993 | Huebschen | B60B 33/045 312/235.1 |
| 5,238,300 | A * | 8/1993 | Slivon | B25H 5/00 108/91 |
| 5,308,094 | A * | 5/1994 | McWhorter | F16M 11/046 280/43.24 |
| 5,330,211 | A * | 7/1994 | Nicholson | B25H 5/00 280/32.6 |
| 5,564,803 | A * | 10/1996 | McDonald | G16H 20/13 312/249.11 |
| 5,642,829 | A * | 7/1997 | Hardison | B65D 43/166 220/491 |
| 5,662,396 | A | 9/1997 | Reeder et al. | |
| 5,819,933 | A * | 10/1998 | Hernandez | B60R 9/00 206/349 |
| 5,853,180 | A * | 12/1998 | Taylor | B62B 3/10 280/47.35 |
| 5,906,383 | A * | 5/1999 | Cortes | B62B 5/0438 280/DIG. 4 |
| 6,029,398 | A | 2/2000 | Sporer | |
| 6,105,980 | A * | 8/2000 | Cino | B62B 5/0083 206/505 |
| 6,201,181 | B1 * | 3/2001 | Azzam | H02S 20/30 136/246 |
| 6,454,108 | B1 | 9/2002 | Gerard | |
| 6,520,609 | B1 * | 2/2003 | Beauregard | A47C 7/62 312/235.2 |
| 6,719,384 | B1 | 4/2004 | Parise et al. | |
| 6,893,030 | B2 * | 5/2005 | Shapiro | B62B 7/10 280/651 |
| 7,134,681 | B1 * | 11/2006 | Jones | B62B 5/06 280/651 |
| 7,144,020 | B2 * | 12/2006 | Huguet | B25H 3/06 280/79.11 |
| 7,168,714 | B2 * | 1/2007 | Gibbs | A01B 1/00 280/79.5 |
| 7,182,350 | B1 * | 2/2007 | Liao | B62B 3/008 280/651 |
| 7,581,736 | B1 | 9/2009 | Garza, Jr. | |
| 7,722,141 | B2 | 5/2010 | Parise et al. | |
| 7,815,215 | B1 * | 10/2010 | Lowe | B25H 3/02 280/47.35 |
| 8,002,293 | B2 * | 8/2011 | Lear | B62B 3/008 280/79.3 |
| 8,523,201 | B2 | 9/2013 | Allen | |
| 8,776,825 | B1 | 7/2014 | Bigham | |
| 8,783,698 | B1 * | 7/2014 | Elizondo | B62B 3/007 280/79.2 |
| 8,814,199 | B2 * | 8/2014 | Shindelar | B62B 1/002 280/651 |
| 9,016,701 | B2 | 4/2015 | Allen | |
| 9,611,071 | B2 * | 4/2017 | Baltz | B65D 19/44 |
| 10,316,584 | B1 * | 6/2019 | Cooper | E06C 1/005 |
| 10,391,625 | B2 | 8/2019 | Gang et al. | |
| 2001/0025740 | A1 * | 10/2001 | Ehnes | B25H 5/00 280/32.6 |
| 2002/0060437 | A1 * | 5/2002 | Whiteside | B60B 33/0068 280/32.6 |
| 2003/0213878 | A1 * | 11/2003 | Stahl | B62B 3/16 248/129 |
| 2005/0035696 | A1 | 2/2005 | Parise et al. | |
| 2005/0046132 | A1 * | 3/2005 | Dulsky | B62B 3/00 280/79.2 |
| 2005/0098966 | A1 * | 5/2005 | Canova | B25H 5/00 280/32.6 |
| 2005/0173878 | A1 * | 8/2005 | Espejo | B62B 3/027 280/47.34 |
| 2005/0269792 | A1 * | 12/2005 | Aronson | B25H 3/00 280/79.11 |
| 2006/0028819 | A1 * | 2/2006 | Shankland | B25H 5/00 362/253 |
| 2007/0228903 | A1 * | 10/2007 | Liu | A47B 47/02 312/249.8 |
| 2008/0164170 | A1 * | 7/2008 | Kirtlink | B25H 3/04 224/576 |
| 2009/0315285 | A1 * | 12/2009 | Glass | B62B 5/0093 206/349 |
| 2011/0127736 | A1 * | 6/2011 | Oliver | B25H 3/00 280/47.17 |
| 2011/0204760 | A1 * | 8/2011 | Finstad, III | B62B 5/0433 29/401.1 |
| 2011/0210023 | A1 * | 9/2011 | DeForest | B65D 85/06 206/304.2 |
| 2011/0221148 | A1 * | 9/2011 | Annese | B62B 9/22 280/47.34 |
| 2011/0304113 | A1 * | 12/2011 | Clover | B62B 3/007 280/47.34 |
| 2012/0085714 | A1 * | 4/2012 | Johnson | A47L 13/51 211/85.17 |
| 2013/0307239 | A1 * | 11/2013 | Smith | B62B 3/1496 29/505 |
| 2014/0245933 | A1 | 9/2014 | Leslie et al. | |
| 2014/0265197 | A1 * | 9/2014 | Russell | B25H 3/02 206/349 |
| 2017/0190344 | A1 * | 7/2017 | Bengtzen | B62B 5/0079 |
| 2017/0341216 | A1 * | 11/2017 | Lin | B25H 3/025 |
| 2018/0029622 | A1 * | 2/2018 | Stuart | B62B 5/06 |
| 2018/0147716 | A1 * | 5/2018 | Gang | B25H 3/028 |
| 2018/0161976 | A1 * | 6/2018 | Kicsak | B62B 5/0093 |
| 2019/0031222 | A1 * | 1/2019 | Takyar | B62B 5/0093 |
| 2021/0170569 | A1 * | 6/2021 | Martin | B62B 3/022 |
| 2021/0323139 | A1 * | 10/2021 | Kuter-Arnebeck | B62B 5/063 |
| 2021/0347035 | A1 * | 11/2021 | Rose | B25H 3/06 |
| 2022/0144326 | A1 * | 5/2022 | Williams | B62B 3/10 |
| 2022/0161379 | A1 * | 5/2022 | Zoller | B25H 3/00 |

FOREIGN PATENT DOCUMENTS

| | | |
|---|---|---|
| CN | 204950105 U | 1/2016 |
| CN | 107738236 A | 2/2018 |
| CN | 207953801 U | 10/2018 |
| CN | 109292198 A | 2/2019 |
| CN | 109846235 A | 6/2019 |
| DE | 202004012592 U | 11/2004 |
| GB | 503715 A | 4/1939 |
| GB | 620113 A | 3/1949 |
| GB | 936293 A | 9/1963 |
| JP | 2002325655 A | 11/2002 |

(56) References Cited

FOREIGN PATENT DOCUMENTS

| | | |
|---|---|---|
| KR | 20190000503 U | 2/2019 |
| TW | M548485 | 9/2017 |
| TW | M591906 | 3/2020 |

OTHER PUBLICATIONS

Examination Report for corresponding Application No. GB2105088.5 dated May 24, 2022, 5 pages.
Hartleysdirect, "Hartley Woven Under Bed Storage Box—Grey," https://www.hartleysdirect.com/hartleys-woven-seagrass-under-bed-storage-box-grey.html?msclkid-e2e172e37585179f504dl3b2d308ef9c &utm_source=bing&utm_medium_=cpc&utm_campaign=Smart% 20Shopping%20Campaigns%20-%20All%20Products&utm_term= 4582489611460567&utm_content=Smart%20Shopping%20-%20All% 20Products, accessed Aug. 23, 2022, 1 page.
United Kingdom Office Action for corresponding UK Application No. GB2105088.5, dated Sep. 28, 2021, 8 pages.
Australian Examination Report No. 1 for corresponding AU Application No. 2021201943, dated Nov. 19, 2021, 6 pages.
https://www.hartleysdirect.com/hartleys-woven-seagrass-under-bed-storage-box-grey.html?msclkid=e2e172e27585179f504313b2d308ef9c &utm_source=bing&utm_medium-cpc&utm_campaign-Smart% 20Shopping$20Campaigns$20-$20All$20Products&utm_term= 4582489611460567&utm_content=Smart%20Shopping%20-%20All% 20Products.
Examiner's Report for corresponding Canadian Application No. 3,114,826 dated Jun. 13, 2022, 3 pages.
Examination Report No. 2 for corresponding Application No. 2021201943 dated Jun. 17, 2022, 3 pages.
Examination Report for corresponding Application No. GB2105088.5 dated Oct. 13, 2022, 5 pages.
Examination Report No. 3 for corresponding Application No. 2021201943 dated Nov. 2, 2022, 3 pages.
Chinese Office Action for corresponding Application No. 2021104079243 dated Aug. 29, 2023, 11 pages.
Examination Report for corresponding Application No. GB2105088.5 dated Jun. 19, 2023, 4 pages.
Chinese Patent Office, Second Office Action issued in corresponding Application No. 202110407924.3, dated Mar. 14, 2024, 10 pp.

\* cited by examiner

STORAGE BIN WITH RETAINING FEATURE

CROSS REFERENCES TO RELATED APPLICATIONS

This application claims priority to and the benefit of U.S. Provisional Patent Application Ser. No. 63/010,753, filed Apr. 16, 2020, entitled Storage Container with Retaining Feature, the contents of which are incorporated herein by reference in their entirety.

TECHNICAL FIELD OF THE INVENTION

The present invention relates generally to storage containers adapted to be placed under a tool storage cabinet.

BACKGROUND OF THE INVENTION

Tool storage cabinets or boxes typically have a space between a bottom of the cabinet or box, or face plate and the floor due to the cabinet resting on risers, legs, or wheels. This space is generally unused. If this space is used, one typically slides, stuffs, or kicks items under the tool storage cabinet or box and must get down on his/her hands and knees, and reach to access items stored in this space and that may have been knocked to the back.

SUMMARY OF THE INVENTION

The present invention relates broadly to a storage container, basin, bin, or basket (referred to herein as a storage bin) with wheels or casters. The storage bin may also include a plate disposed in a center of the bin to increase stiffness of the storage bin. The storage bin is appropriately designed and dimensioned to fit in the space between a bottom of a tool storage cabinet or toolbox and the floor. The storage bin also includes retaining features or tabs that protrude on one side higher than a plane formed by an upper edge of the storage bin to keep the storage bin located under the tool storage cabinet or toolbox. For example, the retaining features may allow the storage bin to be slid under the tool storage cabinet or toolbox with the retaining features disposed between opposing front and back flanges on the bottom of the tool storage cabinet or toolbox. This allows the storage bin to be slid out and back under the tool storage cabinet or toolbox, while the retaining feature restricts the storage bin from being slid completely out from under tool storage cabinet or toolbox.

In an embodiment, the present invention includes a storage bin. The storage bin is dimensioned to fit under a tool storage cabinet. The storage bin includes a bin portion, a wheel coupled to the bin portion, and a retaining portion coupled to and extending upwardly from the bin portion. The retaining portion is adapted to contact a flange disposed on the bottom portion of the tool storage cabinet to restrict the storage bin from being completely moved out from under the tool storage cabinet.

In another embodiment, the present invention includes a storage bin. The storage bin is dimensioned to fit under a tool storage cabinet. The storage bin includes a bin portion, a wheel coupled to the bin portion, a retaining portion coupled to and extending upwardly from the bin portion, and a cap disposed on the retaining portion. The cap is slidable with respect to the retaining portion, and is adapted to contact a flange disposed on the bottom portion of the tool storage cabinet to restrict the storage bin from being completely moved out from under the tool storage cabinet.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
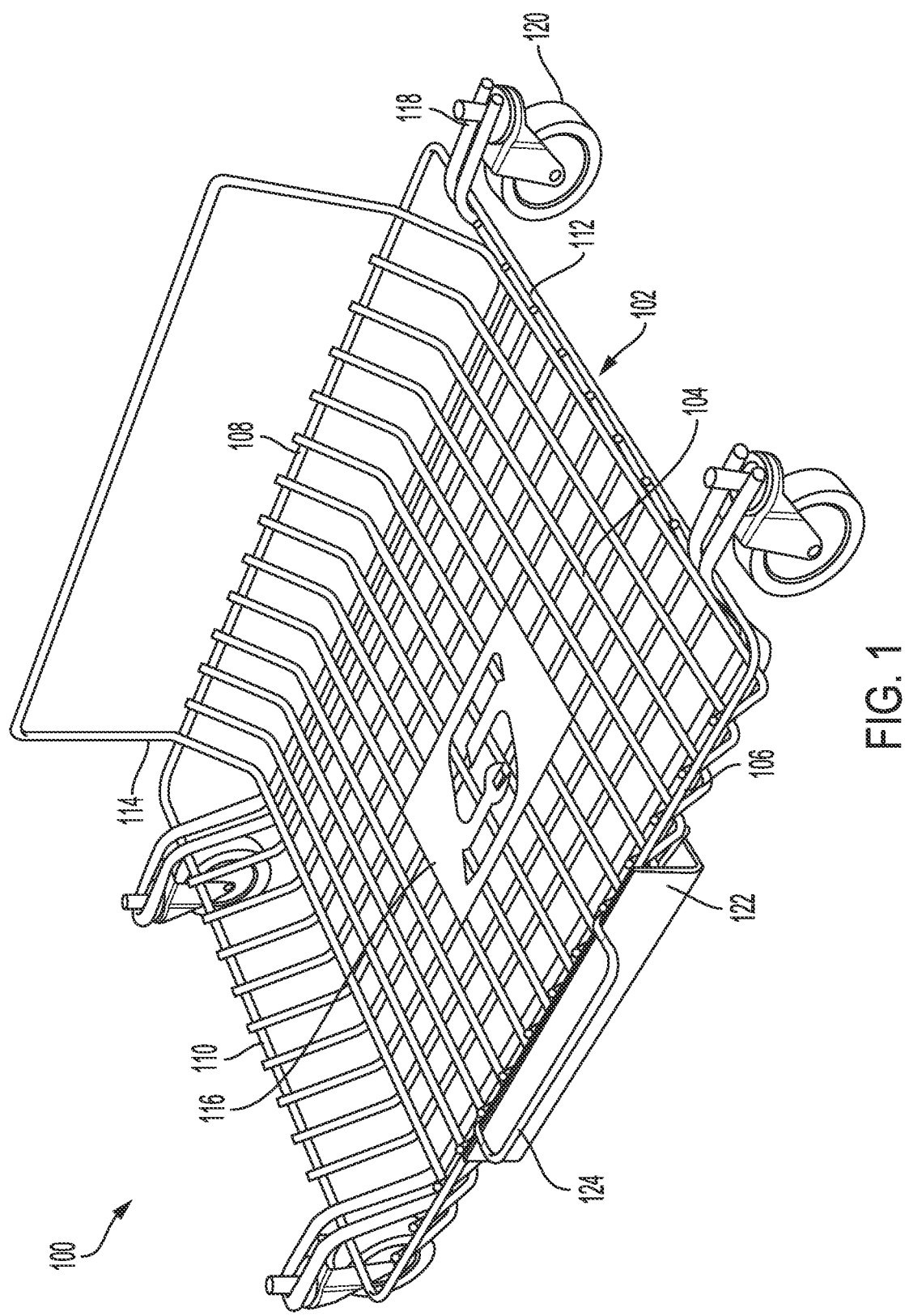
FIG. 1 is a perspective view of a storage bin according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a storage container, basin, bin, or basket (referred to herein as a storage bin) with wheels that is adapted to hold items, such as tools and other objects. The storage bin may also include a plate disposed in a center of the bin to increase stiffness of the storage bin. The storage bin is appropriately designed and dimensioned to fit in the space between a bottom of a tool storage cabinet or toolbox and the floor. The storage bin also includes retaining features or tabs that protrude on one side higher than a plane formed by an upper edge of the storage bin to keep the storage bin from inadvertently being completely pulled out from under the tool storage cabinet or toolbox. For example, the retaining features may allow the storage bin to be slid or rolled under the tool storage cabinet or toolbox with the retaining features disposed between opposing front and back flanges on the bottom of the tool storage cabinet or toolbox. This allows the storage bin to be slid or rolled out and back under the tool storage cabinet or toolbox, while the retaining feature restricts the storage bin from being moved completely out from under tool storage cabinet or toolbox.

Figure 2:
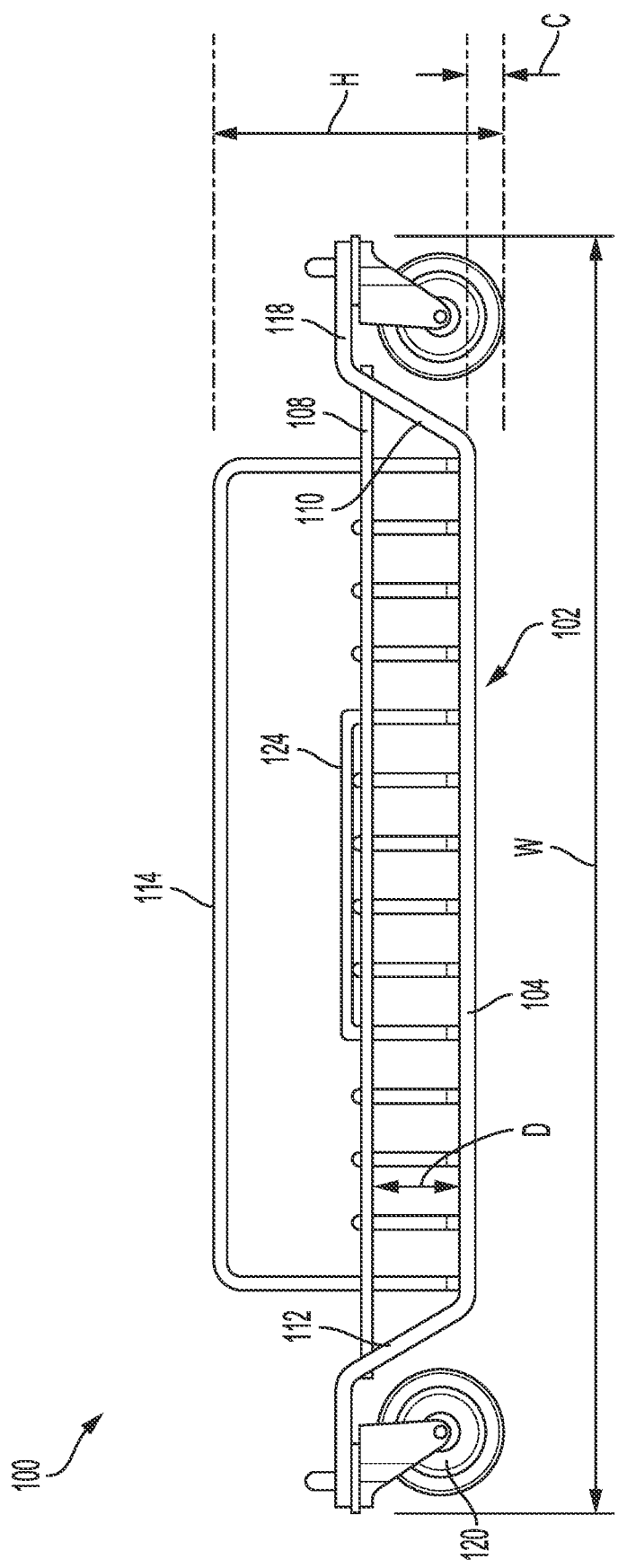
FIG. 2 is a back view of the storage bin of FIG. 1.
Figure 3:
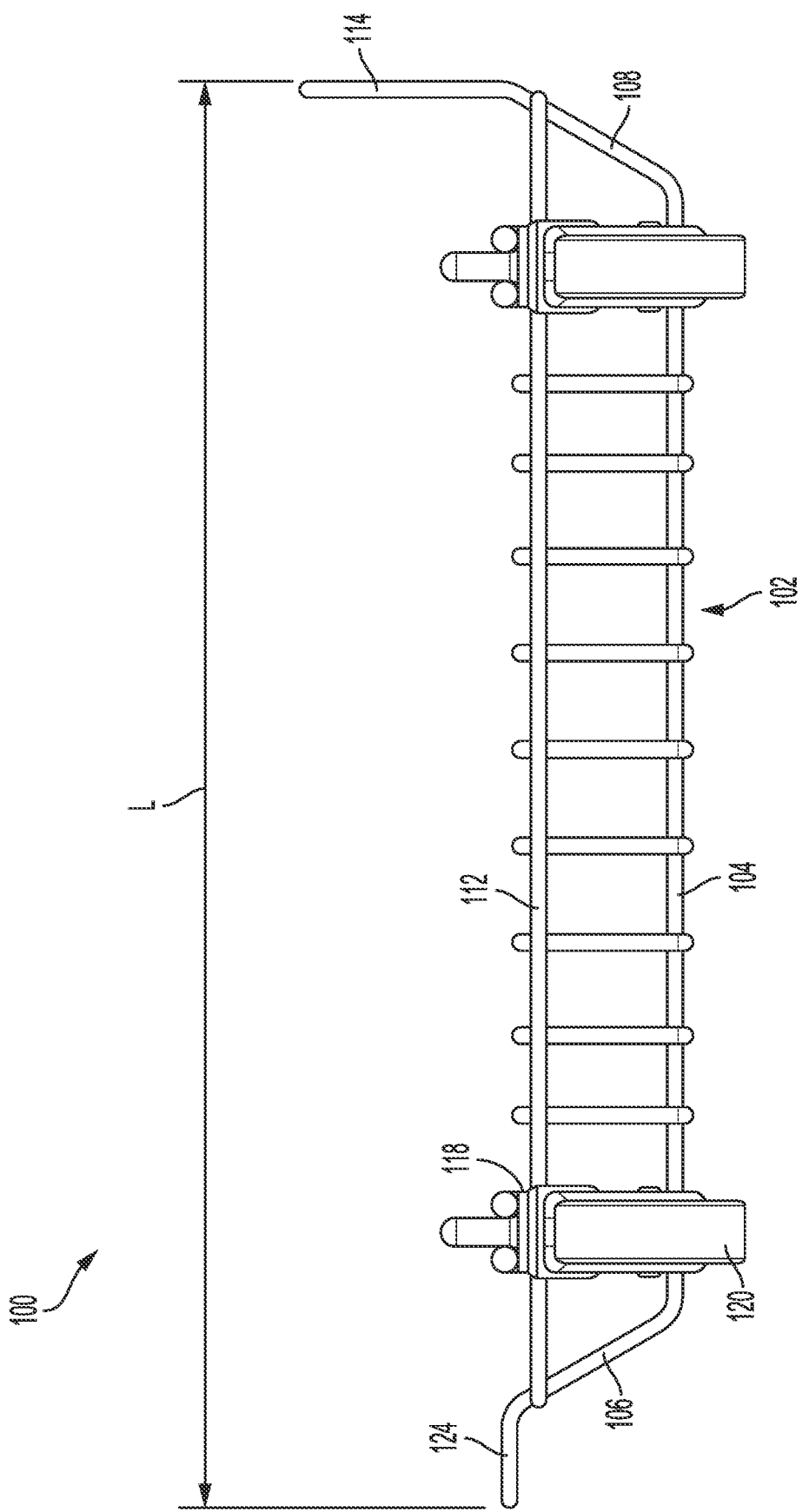
FIG. 3 is a side view of the storage bin of FIG. 1.

Referring to FIGS. 1-3, a storage bin 100 includes a bin portion 102 having a bottom portion 104, front and back side portions 106 and 108, and opposing first and second side portions 110 and 112. The bottom portion 104, front and back side portions 106 and 108, and opposing first and second side portions 110 and 112 collectively form a receiving area or storage area adapted to receive or store items, such as tools and other objects.

In one example, the bin portion 102 is a wire type basket, which may be made of an all welded construction. However, the bin portion 102 can be made of sheet metal, plastic or other polymer and the surfaces may have apertures or holes, or be solid. The bin portion 102 may also include a stiffening plate 116 disposed on or coupled to a surface of the bottom portion 104, to add additional rigidness and stiffness to the bin portion.

In an embodiment, at least one retaining feature 114 is coupled to the bin portion 102, and protrudes upwardly above or higher than a plane formed by an upper edge of the bin portion 102. As illustrated, the retaining feature 114 is a loop coupled to the back portion 108, and that protrudes upwardly from an upper edge of the back portion 108. However, it should be appreciated that the retaining feature 114 may be disposed on or coupled to the front portion 106, first side portion 110, second side portion 112, or coupled to or disposed on adjacent portions of the bin portion 102.

One or more wheel mounting brackets 118 may also be coupled to the bin portion 102. As illustrated, two wheel mounting brackets 118 are coupled to and extend from the first side portion 110, and two additional wheel mounting brackets 118 are coupled to and extend from the second side portion 112. However, the wheel mounting brackets 118 may be coupled to any of the bottom portion 104, front and back side portions 106 and 108, and opposing first and second side portions 110 and 112.

Wheels 120 are respectively coupled to the wheel mounting brackets 118. As illustrated, the wheels 120 are caster type wheels that allow the storage bin 100 to be rolled in any direction. However, the wheels 120 may be any other type of wheels that allow the storage bin 100 to be rolled in one or more than one direction.

The storage bin 100 may also include one or more of a name plate 122 and a handle 124. The handle 124 and name plate 122 may be disposed on or coupled to any of the bottom portion 104, front and back side portions 106 and 108, and opposing first and second side portions 110 and 112. As illustrated, the handle 124 and name plate 122 are coupled to a portion opposing the retaining feature 114, such as the front portion 106.

Figure 4:
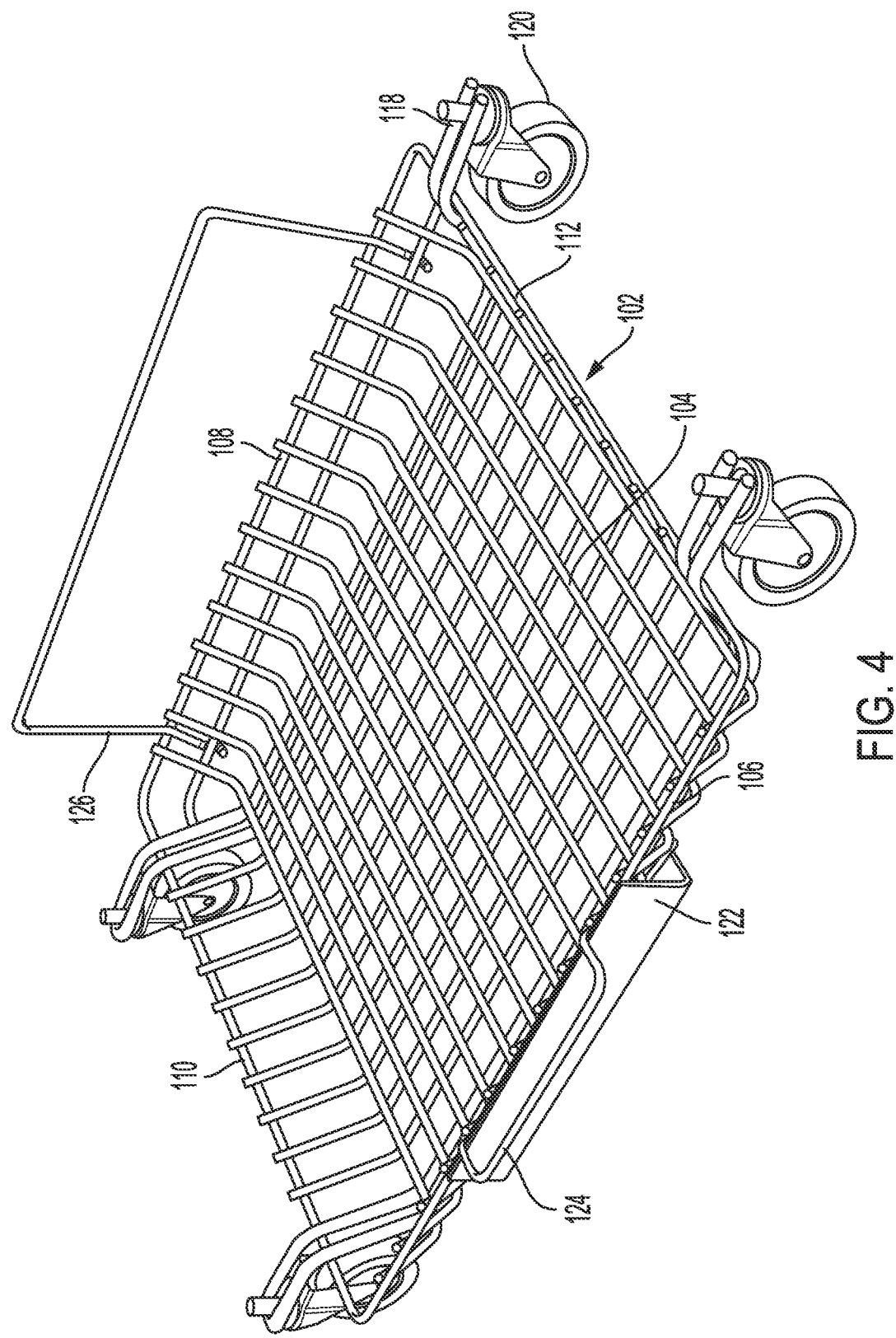
FIG. 4 is a perspective view of another storage bin according to an embodiment of the present invention.

In another embodiment, referring to FIG. 4, the retaining feature 114 may be removable from the bin portion 102, such as retaining feature 126. For example, the retaining feature 126 may be removably coupled to the bin portion 102 via tabs or other removable type connection.

Figure 5:
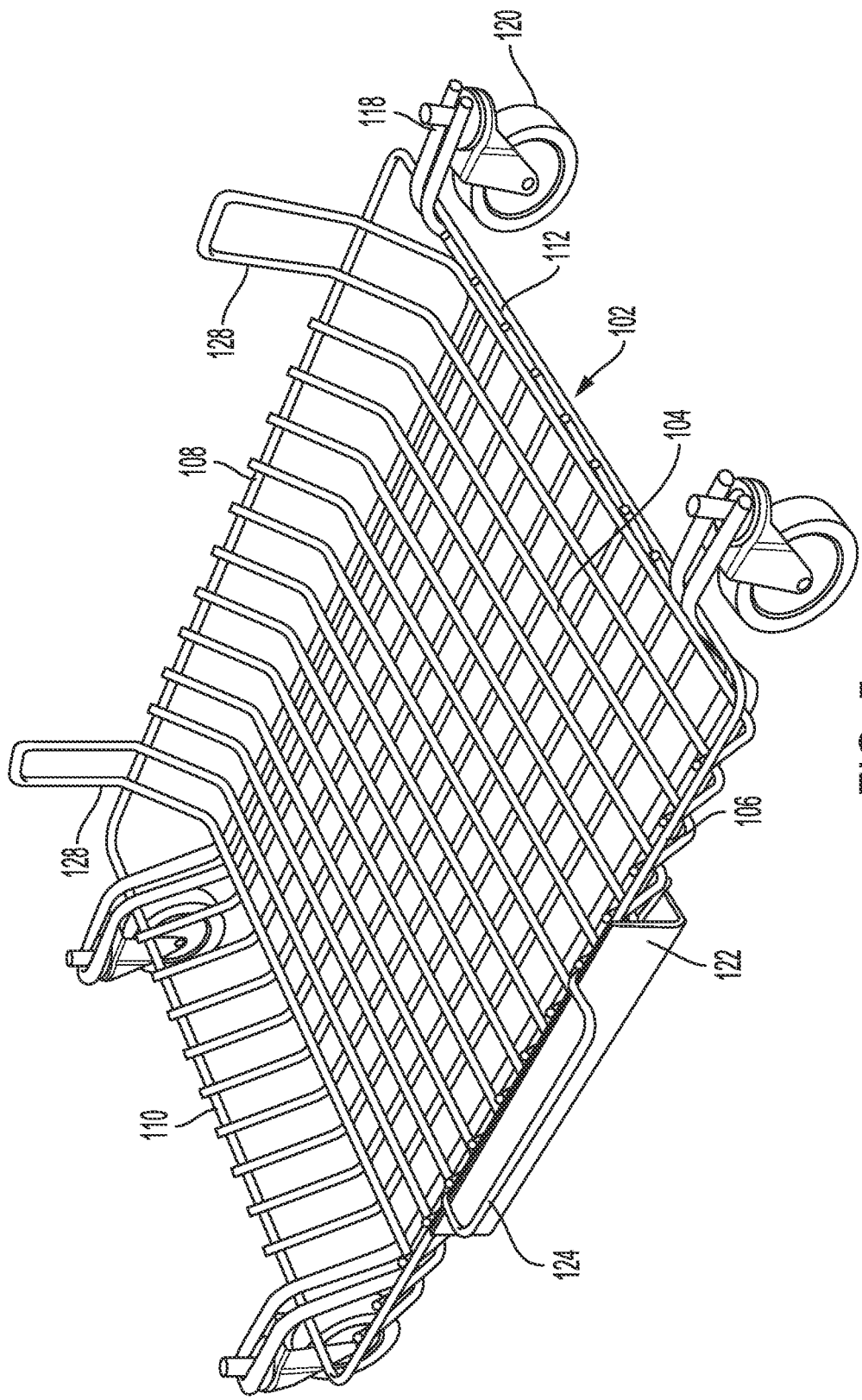
FIG. 5 is a perspective view of another storage bin according to an embodiment of the present invention.

In another embodiment, referring to FIG. 5, the retaining feature 114 may be replaced with one or more smaller retaining features 128, such as two loops. The retaining features 128 may be permanently or removably coupled to the bin portion 102 as described above.

Figure 6:
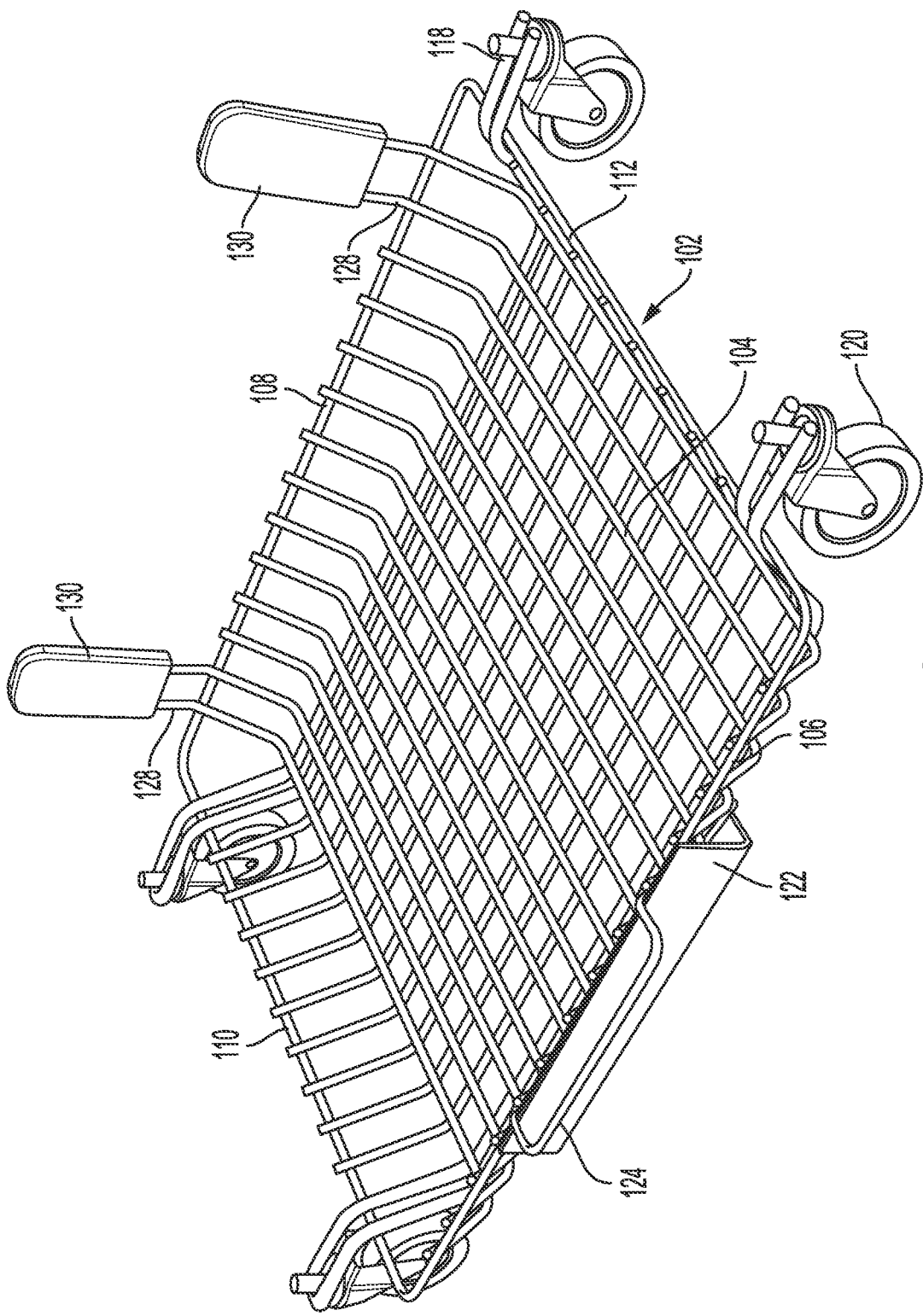
FIG. 6 is a perspective view of another storage bin according to an embodiment of the present invention.

Referring to FIG. 6, a retaining cap 130 may be disposed on the retaining feature 128. The retaining cap 130 may be movable with respect to the retaining feature 128 to allow a height of the retaining feature 128 to be adjusted (i.e., increased or decreased). It should be appreciated that a similar retaining cap may also be adapted to be coupled to or disposed on the retaining feature 114/126.

Figure 7:
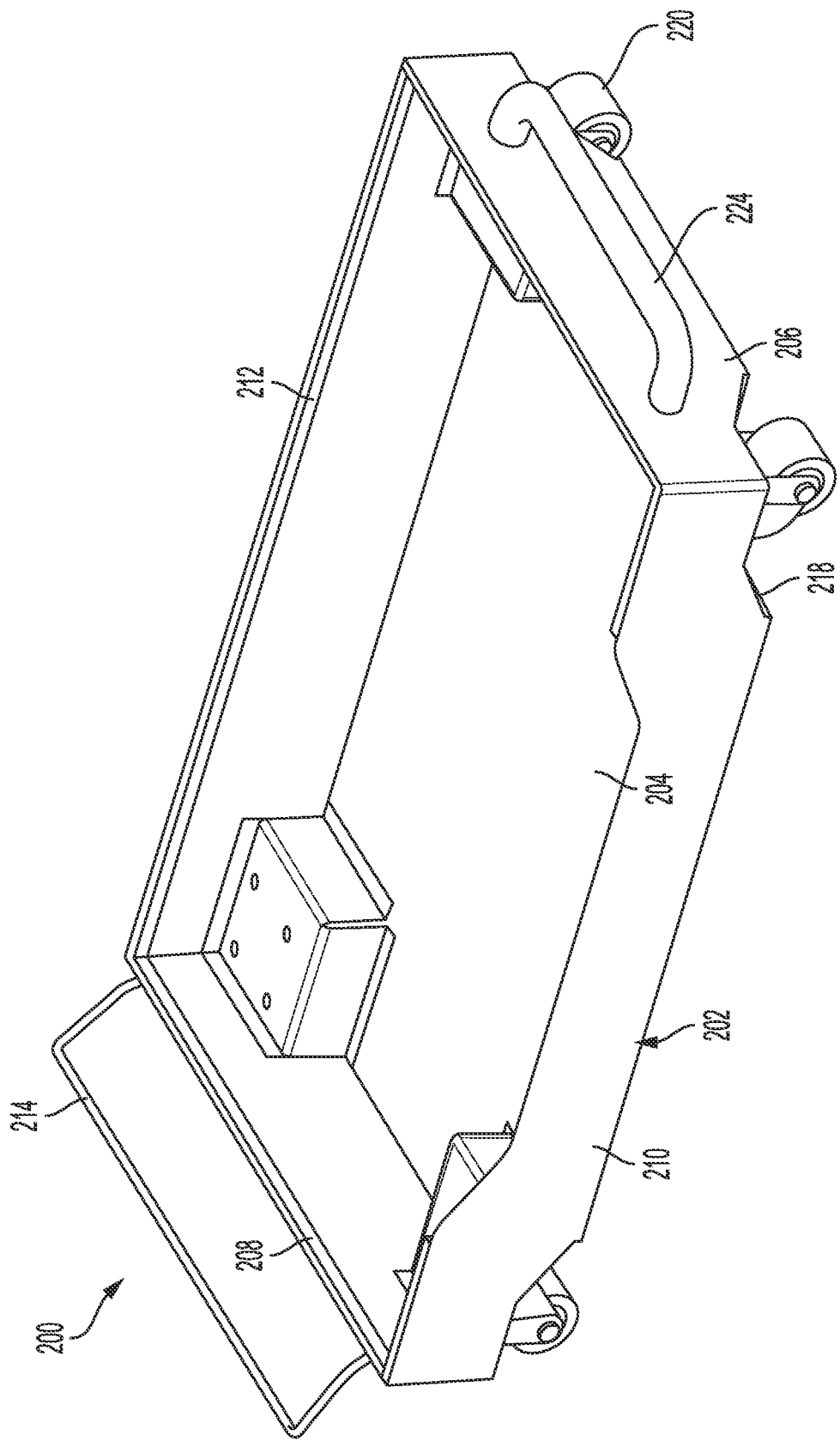
FIG. 7 is a perspective view of another storage bin according to an embodiment of the present invention.

In yet another embodiment, the storage bin may be comprised of solid surfaces. Referring to FIG. 7, a storage bin 200 includes a bin portion 202 having a bottom portion 204, front and back side portions 206 and 208, and opposing first and second side portions 210 and 212. The bottom portion 204, front and back side portions 206 and 208, and opposing first and second side portions 210 and 212 collectively form a receiving area or storage area adapted to receive or store items or other articles. In this example, the bin portion 202 is a solid type construction, which may be made of an all welded construction.

At least one retaining feature 214 (similar to retaining feature 114 described above) is coupled to the bin portion 202, and protrudes upwardly above or higher than a plane formed by an upper edge of the bin portion 202. As illustrated, the retaining feature 214 is a loop coupled to the back portion 208, and that protrudes upwardly from an upper edge of the back portion 208. However, it should be appreciated that the retaining feature 214 may be disposed on or coupled to the front portion 206, first side portion 210, second side portion 212; or coupled to or disposed on adjacent portions of the bin portion 202. It should also be appreciated that any of the retaining features 126/128/130 may be incorporated into the storage bin 200 instead of or in addition to the retaining feature 214.

One or more wheel mounting brackets 218 may also be coupled to the bin portion 202. As illustrated, four wheel mounting brackets 218 are coupled to the bottom portion. However, the wheel mounting brackets 218 may be coupled to any of the front and back side portions 206 and 208 and/or the opposing first and second side portions 210 and 212.

Wheels 220 are respectively coupled to the wheel mounting brackets 218. As illustrated, the wheels 220 are caster type wheels that allow the storage bin 200 to be rolled in any direction. However, the wheels 220 may be any other type of wheels that allow the storage bin 200 to be rolled in one or more than one direction.

The storage bin 200 may also include one or more of a name plate (not illustrated) and a handle 224. The handle 224 may be disposed on or coupled to any of the bottom portion 204, front and back side portions 206 and 208, and opposing first and second side portions 210 and 212. As illustrated, the handle 224 is coupled to a portion opposing the retaining feature 214, such as the front portion 206.

Figure 8:
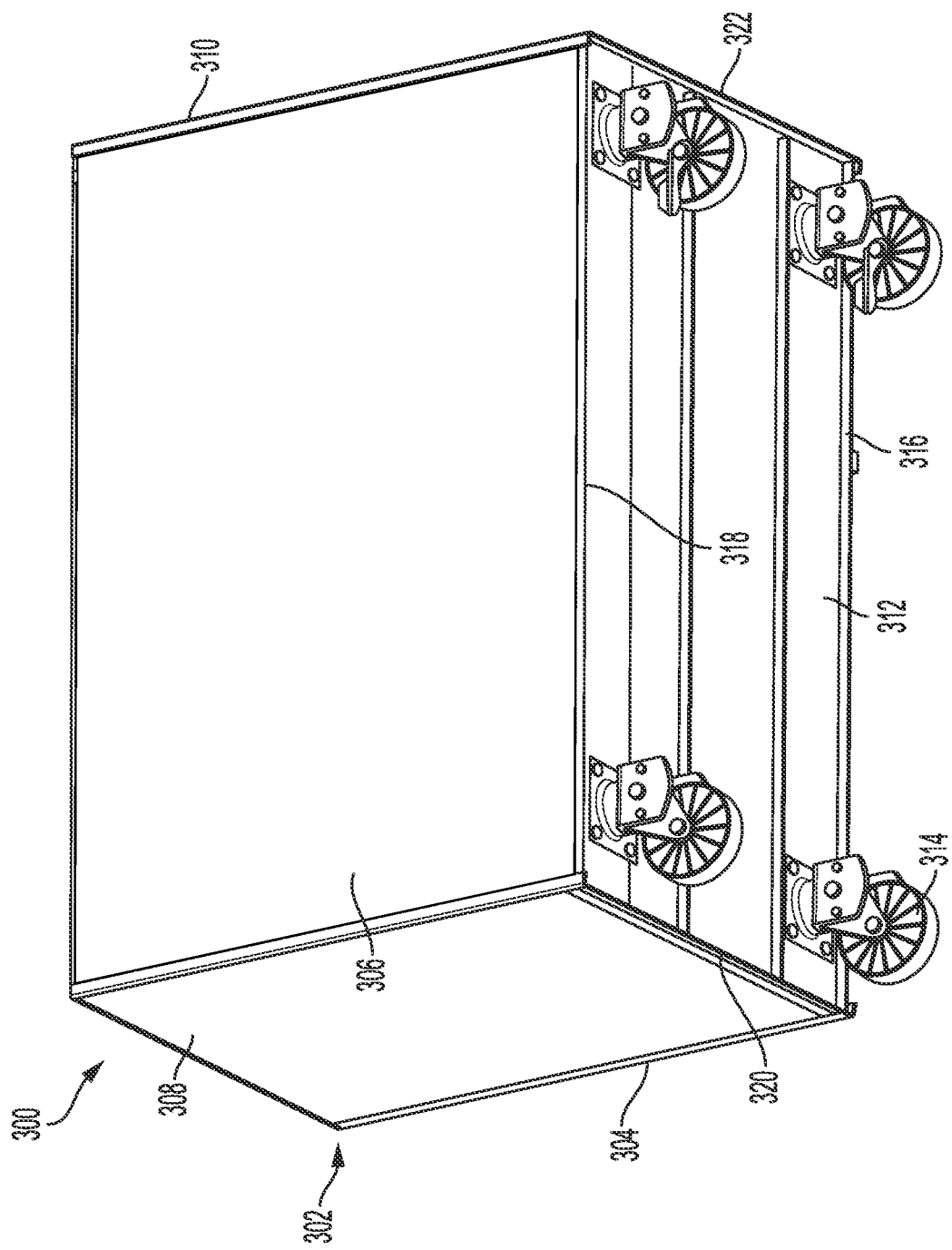
FIG. 8 is a perspective, bottom view of a rear of a tool storage cabinet according to an embodiment of the present invention.

The storage bin 100/200 may be appropriately sized and shaped to allow the storage bin 100/200 to be rolled underneath a tool storage cabinet or toolbox, such as the tool storage cabinet 300 illustrated in FIG. 8. Additionally, the retaining feature 114/126/128/130/214 may protrude upwardly an appropriate height to retain the storage bin 100/200 under the tool storage cabinet or toolbox. For example, referring back to FIGS. 2 and 3, the storage bin 100 may have a width W, a clearance height C between a bottom of the wheel 120 or floor/other surface and a bottom surface of the bottom portion 104, and an overall height H measured from a bottom of the wheel 120 or floor/other surface and a top surface of the retaining portion 114. The bin portion 102 may also have a depth D, and the storage bin 100 may have a length L measure from an end of the handle 124 to an end of the retaining portion 114.

In an embodiment, the width W is about 26 inches to about 60 inches, the depth D is about 1 inch to about 8 inches, the height H is about 6 inches to about 12 inches, the clearance height C is about 0.01 inches to about 3 inches, and the length L is about 15 inches to about 40 inches. It should be appreciated that the retaining features 126/128/ 130/214, and the storage bin 200 may also have the same or similar dimensions.

Referring to FIG. 8, an example tool storage cabinet or toolbox 300 includes a body 302 with front, back, and opposing side portions 304, 306, 308, and 310, respectively. The tool storage cabinet or toolbox 300 also includes a bottom portion 312 with wheels 314 coupled to the bottom portion 312. As illustrated, the bottom portion 312 may be surrounded by front, back, and opposing side flange portions 316, 318, 320, and 322, respectively. In an embodiment, the one or more of the flange portions 316, 318, 320, and 322 are disposed on a bottom surface of the tool storage cabinet.

Figure 9:
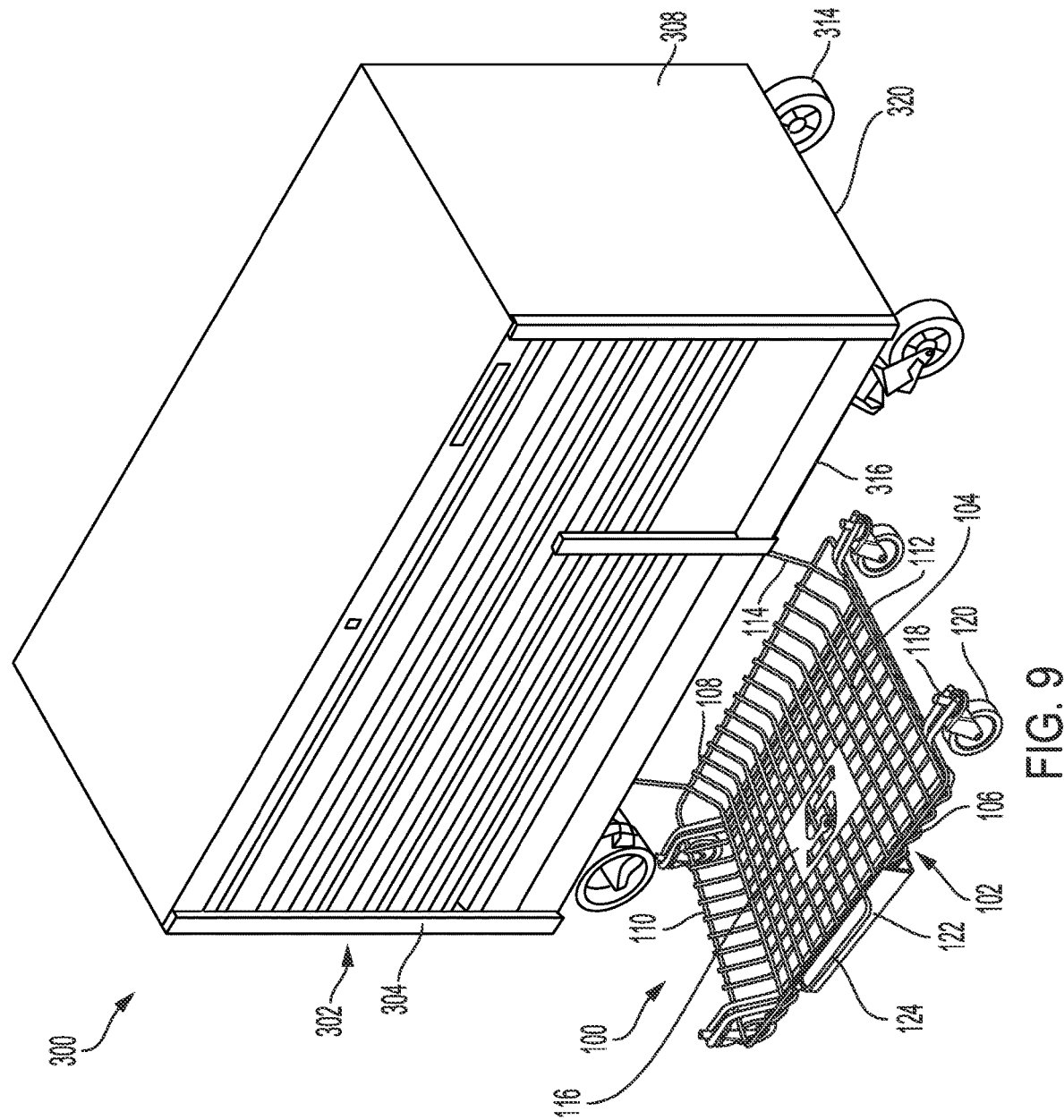
FIG. 9 is a perspective view of the storage bin of FIG. 1 disposed under the tool storage cabinet of FIG. 8, with the storage bin in an accessible position, according to an embodiment of the present invention.
Figure 10:
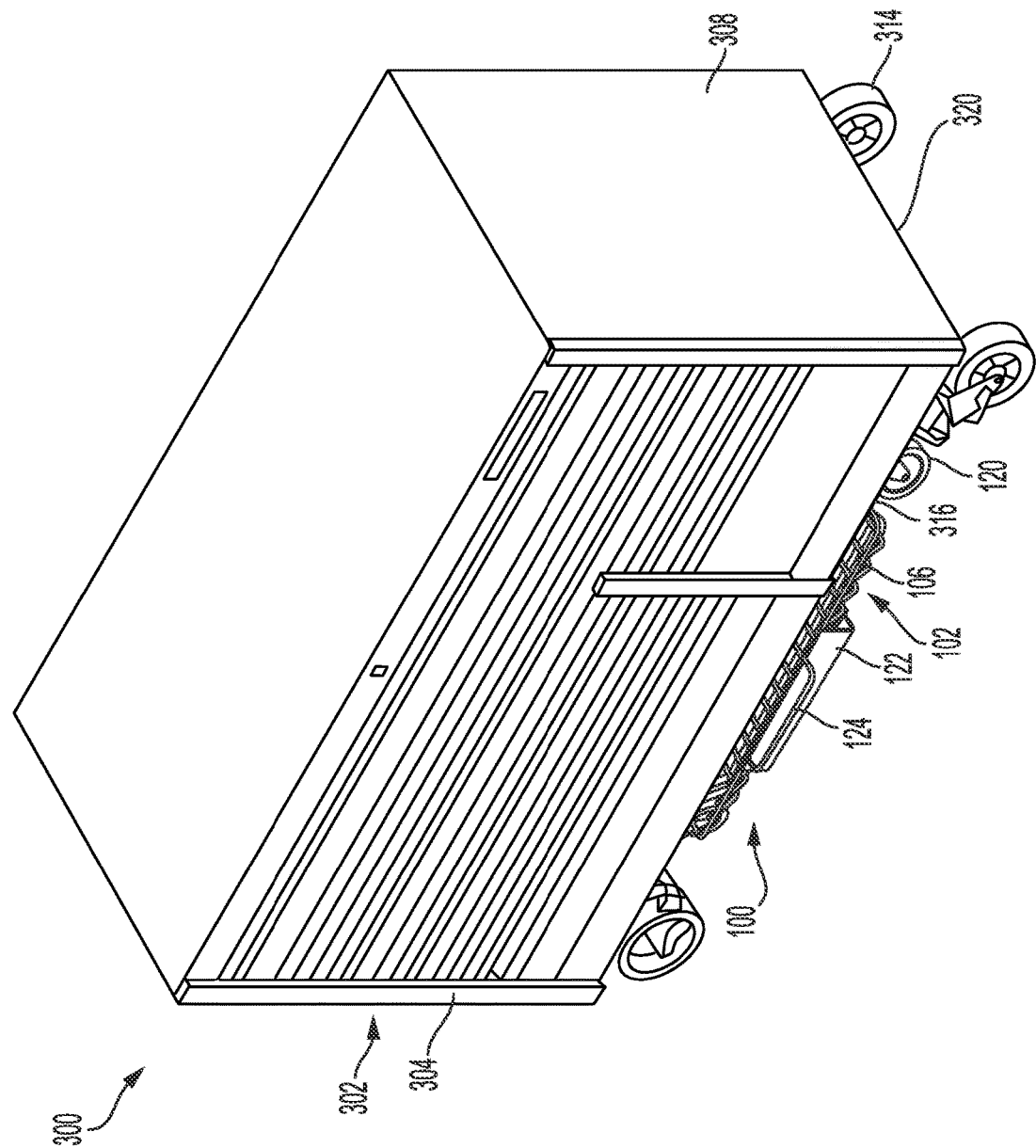
FIG. 10 is a perspective view of the storage bin of FIG. 1 disposed under the tool storage cabinet of FIG. 8, with the storage bin in an inaccessible position, according to an embodiment of the present invention.

As shown in FIGS. 9 and 10, the storage bin 100/200 may be disposed under the bottom portion 312 of the tool storage cabinet or toolbox 300, such as between the bottom portion 312 and a floor surface. The retaining feature of the storage bin 100/200 may be disposed between the front and back flange portions 316 and 318 of the tool storage cabinet or toolbox 300, and abut or contact the front and back flange portions 316 and 318 to restrict movement of the storage bin 100/200 from completely out from under the tool storage cabinet or toolbox 300. For example, referring to FIG. 10, when the storage bin 100/200 is disposed under the tool storage cabinet or toolbox 300 in an inaccessible position (i.e., the interior space of the storage bin, and contents thereof, is inaccessible), the retaining feature may contact the back flange portion 318 and prevent the storage bin 100/200 from being rolled or moved out from under a back of the tool storage cabinet or toolbox 300. Similarly, referring to FIG. 9, when the storage bin 100/200 is disposed under the tool storage cabinet or toolbox 300 and moved to an accessible position (i.e., the interior space of the storage bin, and contents thereof, is accessible), the retaining feature may contact the front flange portion 316 and prevent the storage bin 100/200 from being rolled or moved completely out from under a front of the tool storage cabinet or toolbox 300. When the storage bin 100/200 is disposed under the tool storage cabinet or toolbox 300 and moved to a partially accessible position, the retaining feature may be disposed between and spaced from the front and back flange portions 316 and 318.

Thus, the retaining feature allows the storage bin 100/200 to be moved or rolled between the inaccessible and accessible positions under the tool storage cabinet or toolbox 300, while the retaining feature restricts the storage bin 100/200 from being moved completely out (i.e., extending beyond the accessible position) from under tool storage cabinet or toolbox 300. In other embodiments, the retaining feature of the storage bin 100/200 may contact or abut an exterior surface of the tool storage cabinet or toolbox 300 to restrict movement of the storage bin 100/200.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A storage bin for a tool storage cabinet having a flange extending downwardly from a bottom surface of the tool storage cabinet, the storage bin comprising:
    a bin portion with opposing front and back side portions;
    a wheel coupled to the bin portion; and
    a retaining portion coupled to and extending upwardly from the back side portion, wherein the storage bin is positionable under the tool storage cabinet with the retaining portion spaced from the flange, and when the storage bin is moved in a direction outwardly from under the tool storage cabinet, the retaining portion is moved towards the flange and is adapted to contact the flange to restrict the storage bin from being completely moved out from under the tool storage cabinet.

2. The storage bin of claim 1, wherein the retaining portion is adjustable and adapted to allow a height of the retaining portion to be adjusted.

3. The storage bin of claim 1, further comprising a stiffening plate coupled to a bottom portion of the bin portion.

4. The storage bin of claim 1, wherein the retaining portion extends at least partially across the back side portion.

5. The storage bin of claim 1, further comprising a handle coupled to the front side portion.

6. The storage bin of claim 4, wherein the wheel includes wheels respectively coupled to the bin portion proximal to the front and back side portions.

7. The storage bin of claim 4, wherein the bin portion includes opposing first and second side portions, and the front, back, first, and second side portions cooperatively form a receiving area.

8. The storage bin of claim 4, further comprising a name plate coupled to the front side portion.

9. The storage bin of claim 1, wherein the retaining portion is a loop coupled to the back side portion.

* * * * *